United States Patent [19]

Moine et al.

[11] Patent Number: 5,771,483
[45] Date of Patent: Jun. 23, 1998

[54] INTERNAL COMBUSTION ENGINE TORQUE MEASUREMENT DEVICE AND METHOD

[75] Inventors: Xavier Moine, Rueil-Malmaison; Jean-Marie Taupin, Clamart, both of France

[73] Assignee: Renault, Boulogne-Billancourt, France

[21] Appl. No.: 776,587

[22] PCT Filed: Jun. 7, 1996

[86] PCT No.: PCT/FR96/00864

§ 371 Date: May 1, 1997

§ 102(e) Date: May 1, 1997

[87] PCT Pub. No.: WO96/42002

PCT Pub. Date: Dec. 27, 1996

[30] Foreign Application Priority Data

Jun. 8, 1995 [FR] France ................................ 95 06780
Jun. 8, 1995 [FR] France ................................ 95 06781

[51] Int. Cl.⁶ ........................... G01L 3/00; G01M 15/00
[52] U.S. Cl. ........................... 701/110; 73/116; 73/117.3; 123/419; 123/436
[58] Field of Search ...................... 701/110, 101, 701/99; 73/116, 117.2, 117.3; 123/419, 425, 436

[56] References Cited

U.S. PATENT DOCUMENTS

| 5,331,848 | 7/1994 | Nakagawa et al. ................ 73/116 |
| 5,396,427 | 3/1995 | Piehl et al. ......................... 73/116 |
| 5,487,008 | 1/1996 | Ribbens et al. ................... 701/110 |
| 5,505,079 | 4/1996 | Rossignol ........................ 73/117.3 |
| 5,522,256 | 6/1996 | Hashimoto et al. .............. 73/116 |
| 5,528,929 | 6/1996 | Ikebuchi ........................... 701/110 |
| 5,546,793 | 8/1996 | Gimmler et al. ................. 701/110 |
| 5,652,380 | 7/1997 | Machida ............................ 73/116 |
| 5,663,493 | 9/1997 | Gerbert et al. ................... 73/116 |

*Primary Examiner*—George M. Dombroske
*Attorney, Agent, or Firm*—Oblon, Spivak, McClelland, Maier & Neustadt, P.C.

[57] ABSTRACT

This method includes detecting the passage before a sensor of each of the teeth of the inertial flywheel of an engine; measuring the time of passage $d_i$ of each of these teeth; constituting a measurement horizon extending on both sides of the angular range of the explosions; dividing this measurement horizon into eight sets of teeth of equal length of which six are for the angular range of the explosions; measuring the passage times of these eight sets and in assigning them a rank in the measurement horizon $du_{+1}$, $du_0$, ..., $du_5$, $du_{+1}$; calculating the period of the explosions $T=du_0+du_{+1}+du_2+du_3+du_4+du_5$; calculating a term $Q_c=2du_0-du_{-1}-du_3-du_{+1}+2du_5$; calculating a term $D_c=p\cdot Q_c$ where $p=\pi/2\sqrt{3}$, a constant stored in a memory; and calculating the desired torque using the relation $Cg_c=A\cdot D_c/T^3+B/T^2$ in which A and B are constants stored in a memory.

20 Claims, 5 Drawing Sheets

INTERNAL COMBUSTION ENGINE TORQUE MEASUREMENT DEVICE AND METHOD

BACKGROUND OF THE INVENTION

1. Field of the Invention

The invention concerns a method and a device for measuring the torque of an internal combustion engine and, more precisely, to improvements to this method and device for measuring the aforementioned torque as described in French Patent No. 9,111,273 filed by the applicant.

2. Discussion of the Background

In this patent a device is described to produce a numerical value Cg which is representative of the mean gas torque generated by each combustion of the gaseous mixture in the cylinders of a combustion engine at low level operating conditions. This device comprises:

measurement references arranged on a ring gear which is integrally connected to the inertial flywheel of the engine or the shaft;

means to define at least one reference for indexing the reference;

a sensor which senses the passage of the references and which is mounted in a fixed manner in the vicinity of the ring gear;

calculation means to produce a primary numerical value $d_i$, which is representative of the instantaneous passage time before the sensor of each of the references;

calculation means to derive from the primary numerical values $d_i$ a secondary numerical value T which is representative of the total passage time before the sensor of each series of n references in the angular range of the combustions of the engine;

calculation means to derive a second secondary numerical value D, which is representative of the projection onto a phase reference line of the references, corresponding to the origin of the angular periods of the combustions, of the amplitude of the alternating component of the instantaneous passage times di of the references before the sensor, at the frequency of the combustions in the engine. The defining relation D is:

$$D = \sum_{0}^{(n-1)} d_i \cdot \cos(i \cdot 2\pi/n)$$

hereafter called the initial relation calculation means to derive the desired numerical value Cg from the relation $Cg = A \cdot d \, d/T^3 + B/T^2$, where A and B are experimentally determined constants.

In a variant, the same patent proposes, to decrease the calculation times, to regroup the n references of an angular range of combustions into three or four sets and to calculate the above-mentioned term D from the passage times of these sets before the sensor.

SUMMARY OF THE INVENTION

A first object of the invention is to propose a method and device for simplified calculation of the term D, using a small number of reference sets and producing a result which is essentially identical to that supplied by the initial calculation procedure, while at the same time considerably decreasing the number of mathematical operations required.

A second object of the invention is to propose a method and complementary device either of the fundamental method described in the patent referenced above, or of the method and device according to the first object of the present invention, to measure the variations at a low frequency of the resistant torque applied to the engine to allow the assignment of a quality factor to the torque measurement performed.

A third object of the invention concerns a method and device derived from the preceding ones to correct the low-frequency perturbations undergone by the engine torque, especially those caused by the oscillations of the vehicle or by sudden changes in load.

A fourth object of the invention is to propose a method and device to carry out a new correction integrating the effects of the richness of the mixture of the recirculation rate, of the exhaust gases and of the transient operating conditions of the engine. This new correction may or may not be combined with the above-mentioned corrections.

According to a first object of the invention, a method for the calculation in a simplified manner of the term D mentioned above consists in:

establishing a measurement horizon equal to at least the angular range between consecutive explosions in the engine;

regrouping the instantaneous passage time di of the references contained in this measurement horizon in a relatively small number of $du_0, \ldots, du_m$ passage times of reference sets and in assigning to these times du their rank $0 \ldots m$ in each measurement horizon;

combining together, by addition and subtraction, possibly weighted, a number of times having predetermined ranks, so as to produce a magnitude Q which has a nonzero frequency response at the analysis frequency of the explosions of the engine;

determining a weighting constant such that the frequency response of the term $D = p \cdot Q$ is at least for said analysis frequency and for the combination of the measurements used for Q, identical to that obtained for the term D calculated by said initial relation.

According to a first embodiment of the preceding method, the measurement horizon exactly corresponds to the angular interval separating two consecutive explosions of the engine, the number of reference sets being six and the six measurement times referenced $du_0, \ldots, du_5$, the magnitude $Q = (du_0 + du_5 - du_2 - du_3)$ and the constant $p = \pi/2\sqrt{3}$, when the reference sets have the same angular length $\pi/6$.

Thanks to this simplified calculation method, the value obtained for the term D is essentially identical to that initially obtained, and this applies in spite of the fact that the number of arithmetic operations to be performed has been reduced to four. This considerably reduces the specifications of the microprocessor used to perform the calculations. Moreover, it should be immediately noted that the practical embodiment forms of the methods according to the invention are determined by a systematic analysis of the mathematical equivalents of the initial relation which defines D.

In a second embodiment of the method, the measurement horizon is equal to the above defined horizon, increased by an additional packet $du_6$, the term Q then being equal to $Q = du_0 - du_3 + 3/2 \cdot (du_6 - du_4)$. The second form has the advantage of improved discrimination between late combustions and combustion misses of the engine.

According to the second object of the invention, a method to measure the variations $\delta Cg$ of the resistant torque applied to a two- or four-cylinder engine consists in:

establishing a measurement horizon which is equal to at least the angular range between two consecutive explosions in the engine;

regrouping the instantaneous passage times di of the references contained in this measurement horizon in a relatively small number of $du_0, \ldots, du_m$, passage times of reference set and identify these times du by their rank $\mathbf{0} \ldots$ m' in each measurement horizon during the course of an analysis, the angular values of the time sets of ranks $\mathbf{0}$ and m' being equal;

assigning the reference $du_{-1}$ to the time of the last reference sets of the last measurement horizon analyzed before and the reference $du_{+1}$ to the time of the first reference sets of the next measurement horizon to be analyzed;

combining four of these data elements du using the relation $q=\delta u=(du_0-du_{-1}+du_{m'}-du_{+1})$;

deriving the desired term $\delta Cg$ using the relation $\delta Cg = a.q.A/T^3$, where a is a new constant which is dependent on the angular value of the four reference sets concerned.

According to a first embodiment of this method, the angular length of each reference set is $\pi/6$ and the constant $a=\pi/2\sqrt{3}$.

According to the third embodiment of the invention, a method to produce a value of the term D defined above, with corrections for low-frequency perturbations which affect the engine because of changes in resistant torque applied to this engine, consists in calculating this value according to the relation Dc=pQ+aq, where a and p are two constants which may be identical.

The implementation of this third method is particularly simple and effective, due to the considerations indicated below.

The calculation of the mean gas torque Cg expressed by the fundamental relation $Cg=A\cdot D/T^3+B/T^2$ remains valid for as long as the load applied to the engine is decoupled for the analysis frequency considered. However, at low levels of rotation, the analysis frequency approaches the oscillation frequency of the load. In the case of strong variations in the load (sudden demand for torque, oscillation of the vehicle on a road in poor condition, initiation of transmission resonance), the calculation of the mean gas torque is perturbed according to the relation:

Corrected Cg=measured Cg $-k\cdot dC_c/d\theta$, where $C_c$ is the resistant torque applied to the engine (the load) and k, a constant equal to the ratio of the mean gas torque to the component of the instantaneous gas torque at the analysis frequency. In the case where the measurement horizon is one-half turn or a complete turn, the limits of this horizon correspond to dead center for all cylinders. The torque exerted on the shaft by the pressure existing in the cylinders is thus zero since the lever arms are zero at that instant. The load applied to the shaft can then be calculated by measuring the acceleration of the flywheel about dead center.

Let d– and d+ be the times corresponding to an angle $d_r$ on both sides of dead center. The load applied to the flywheel is then: $C_c=J\cdot\pi^3/d\theta^2\cdot(d+-d-)/T^3$, where J is the total inertia of the flywheel and the shaft. By using $C_{c-}$ and $C_{c+}$ to designate the torques so calculated respectively at the beginning and the end at the end of a measurement horizon, the instantaneous variation of the load torque affecting the measured torque Cg is $\delta Cg = k\cdot(C_{c+}-C_{c-})/\pi$.

Corrected $Cg$=measured $Cg - k\cdot(C_{c+}-C_{c-})/\pi$.

From the times of the sets with angular length $\pi/6$ and, taking into account that the term A of the relation defining Cg and that the terms k and J above are connected, the variation of the load torque can be written, with good precision:

$\delta Cg=(\pi/2\sqrt{3})\cdot(du_0+du_5-du_{-1}-du_{+1})\cdot A/T^3$.

Any nonzero value of this term $\delta Cg$ is a factor which negatively affects the quality of any measurement of Cg performed at that instant.

From the value of $\delta Cg$ it is in addition possible to directly apply a correction to the term D indicated above and to write ($a=p=\pi/2\sqrt{3}$):

$D_c=P(Q+q)=\pi/2\sqrt{3}\cdot(2du_0-du_{-1}+2du_5-du_3-du_{+1})$ and $Cg_c=AD_c/T^3+B/T^2$.

Under these conditions, by means of a simple complementary calculation, the corrected mean gas torque $Cg_c$ calculated from the corrected term $Q_c$ is insensitive to variations at low pressure of the resistant torque for as long as the approximation of this torque by a parabola remains valid within the measurement horizon. This is the case for as long as the value of the term $\delta Cg$ remains relatively low, which corresponds to the absence of either large perturbations of the resistant torque applied to the engine or abrupt changes of large amplitude affecting this torque. The term $\delta Cg$ can quite clearly be produced independently of the term D. In this case, it constitutes a negative quality factor for the torque Cg, regardless of the manner in which this torque is calculated.

According to the fourth object of the invention, the method used to take into account the particular conditions of a combustion affecting the determination of the numerical value Cg of the mean gas torque generated by each combustion of gaseous mixture in the cylinders of a four-stroke and four-cylinder combustion engine at low-level operating conditions, and consequently to correct this numerical value, which is expressed by the relation: $Cg=A\cdot D/T^3+B/T^2$, is characterized in that it consists in:

determining the air mass M pumped in a cylinder during the period of combustion of another cylinder;

determining the pumping torque Cp required for this purpose;

storing in memory these two data element during the following two combustion periods;

combining this data to produce a correction term $H_{n'}$ for the torque $Cg_{n'}$, which pertains to the combustion period of rank n' according to the relation:

$H_{n'}=-\delta\cdot(M_{n'-2}+M_{n'-1})+\alpha\cdot Cpn'_{-2}$;

in which $\delta$ and $\alpha$ are constants which depend on the type of engine, and calculating the corrected mean gas torque, generated during the combustion period of rank n', according to the relation $Cg_{cn'}=h\cdot Cg_{n'}+H_{n'}$, where h is a calibration constant which is dependent on the type of engine.

According to a particular characteristic of the method according to the invention:

determination of the air mass M consists in measuring the pressure Pc in the air-intake manifold of the engine and in calculating $M=Pc\cdot R_N$, where $R_N$ is the essentially constant filling coefficient of the cylinders of the engine;

determination of the pumping torque Cp consists in measuring the atmospheric pressure Pa and in calculating Cp=(Pc–Pa).

The implementation of this particular characteristic of the method according to the invention makes it possible to express the term $H_{n'}$ according to the relation:

$$H_{n'} = -\delta \cdot R_N(Pc_{n'-2}+Pc_{n'+1}) + \alpha \cdot (Pc_{n'-2}-Pa).$$

Due to these arrangements, a correction is applied to the measurement of the torque of a four-stroke engine with four cylinders, which correction is adapted to the operation with a lean mixture, to a high recirculation rate of the exhaust gases and/or to the transitory conditions of the engine (variation in the butterfly valve angle). All these advantages result from the considerations indicated below.

The torque exerted by the pressure of the gases on the crankshaft is the resultant of the torque applied by the cylinder in the expansion phase and of the torque applied by the cylinder in the compression phase. In the case of a theoretical thermodynamic cycle, the two expansion and compression torques are adiabatic, and thus identical to the nearest factor k (k increases when the combustion energy, and thus the richness, increases).

In the case of a four-stroke four-cylinder engine, if $C_{comp}$ (θ) represents the instantaneous torque exerted by the cylinder in the compression phase, the torque exerted by the cylinder in the expansion phase is then equal to:

$$c \exp = k \cdot C_{comp}(\pi - \theta).$$

The gas torque is the sum of the expansion torque, the compression torque (negative because resistant) and of the pumping torque. Pc being the pressure in the intake manifold and Pa the atmospheric pressure, it is possible to consider the pumping torque to be proportional to (Pc−Pa). The gas torque is thus:

$$C_{gas} = C_{exp} - C_{comp} + \alpha \cdot (Pc-Pa) = (k-1) \cdot C_{comp} + \alpha \cdot (c-Pa).$$

In the case of a computer estimation of the torque Cg defined by the relation indicated above, the symmetry of the curve of the coefficients with respect to the median plane of the measurement horizon is transformed into a curve with odd symmetry with respect to the torque. The result is that the resistant compression torque is considered a positive torque, just like the expansion torque, by the method for measuring Cg. The measured value of the torque is:

$$Cg = A \cdot D/T^3 + B/T^2 = \beta \cdot (C_{comp} + C_{exp}).$$

However, the compression torque $C_{comp}$ can be calculated from the air mass introduced into the cylinder, which can be derived, either from a measurement with a flowmeter or from a compression measurement. In the case of the pressure, the compression torque is proportional to the pressure Pc in the manifold and to the filling coefficient $R_N$ of the cylinder of the engine (which depends on the operating condition of the engine):

$$C_{comp} = \delta \cdot R_N \cdot Pc.$$

In the case of the generated gas torque, the torque $C_{comp}$ is the compression torque of the cylinder which will be in the expansion phase at the time of the measurement (pressure $Pc_{(n-2)}$), whereas for Cg, the measured gas torque, the torque $C_{comp}$ of the cylinder in the compression phase is measured at the time of the measurement (pressure $Pc_{(n-1)}$). In contrast, the filling coefficient can be the same for the two cylinders because there is little variation in the operations condition of the engine. By combining the above equations, we get:

$$Cg_c = C_{exp} - C_{comp} + \alpha(Pc_{(n-2)} - Pa)$$

or $Cg_c = h \cdot Cg + H$, where h is a calibration constant which is a function the type of engine, and:

$$H = \delta \cdot R_N \cdot (Pc_{(n-1)} + Pc_{(n-2)}) + \alpha(Pc_{(n-2)} - Pa),$$

in which $\alpha = V/\pi$, where V is the unitary displacement of the engine, and $\delta = 1.14V$ in a first approximation (with k=4.5) adjustable for each type of engine and filling coefficient $R_N$ filling coefficient of the engine, which is dependent on the operating conditions but is equal to 1 in a first approximation (it varies from 0.8 to 1.02 as a function of the increasing operating conditions).

It is recalled that the term $R_N \cdot PC$ represents the air mass introduced into the cylinder. Consequently it can be replaced by another Da/N estimator, where Da is the flow rate of the air mass in the manifold and N is the number of turns per second of the crankshaft. Similarly, the term (Pc−Pa) can be replaced by $(D \cdot T - M_0)$, where $M_0$ is the air mass introduced into a cylinder for a fully-opened butterfly valve.

BRIEF DESCRIPTION OF THE DRAWINGS

The characteristics and the advantages of the invention will become more precise in the description of a particular embodiment of the invention given below as a nonlimiting example, with reference to the drawings in the appendix, in which.

DESCRIPTION OF THE PREFERRED EMBODIMENTS

Figure 1:
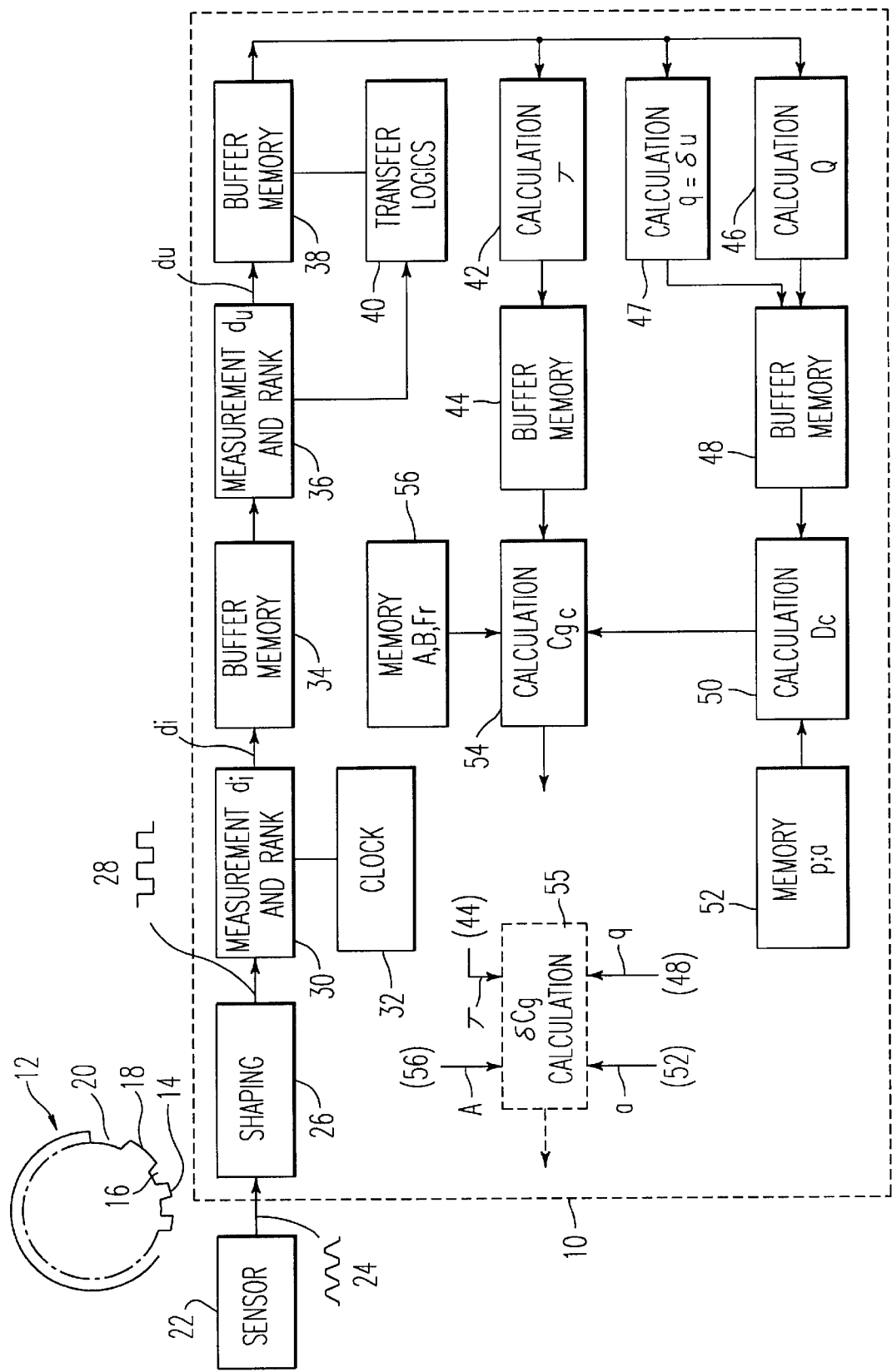
FIG. 1 is a diagram of the different elements which constitute the measurement device according to the invention.

According to FIG. 1, a circuit 10 is represented, for the measurement of the mean gas torque $Cg_c$, corrected for low-frequency perturbations, which is produced by each combustion of the gaseous mixture in a four-stroke four-cylinder combustion engine equipped with a toothed measurement ring gear 12 which is integrally connected to the flywheel of an engine with electronic ignition. For example, the ring gear 12 includes, a its perimeter, fifty-six identical teeth which are regularly spaced, such as those formed by the solid part 14 and the recessed part 16, distributed into two series of twenty-eight teeth separated by two diametrically opposite reference teeth, such as the ring gear formed by the solid part 18 and the recessed part 20 which have a width which is twice that of the other teeth. In fact, the ring gear 12 comprises (2×28+2×2)=60 equidistant references which are made up of real or virtual teeth of the same module. The two broad teeth which are diametrically opposite are used as reference or origin of indexation to allow the numbering of each of the teeth and especially the identification of the tooth do which will be defined below.

With the four-stroke four-cylinder combustion engine referred to in the example above, it should be noted immediately that the angular period of the combustions concerns 30 teeth and it is equal to half the period of rotation of the crankshaft.

A fixed sensor 22 is associated with crown 12, for example, one with variable reluctance, which is adapted for the delivery of an alternate signal 24 having a frequency proportional to the speed of passage of the teeth of the ring gear that is proportional to the instantaneous speed of the flywheel.

The angular position of this sensor 22 with respect to the indexing teeth 18 at the time when the piston of a cylinder is at top dead center is known or determined. This allows the identification of the tooth do as being the one which passes before the sensor during the passage of the piston of a given cylinder through its top dead center of combustion. The signal delivered by the sensor 22 is applied to the inlet of a shaping circuit 26 which is adapted to the delivery of signals 28 with steep edges, having a period equal to the instantaneous period $d_i$ of the incident signals 24, the index i varying from 0 to 29 as the teeth pass before the sensor. Each period $d_i$ of the signal so produced corresponds to the passage time of one tooth, either a solid part or a recessed part, before the sensor 22. As far as the incident signals produced by the reference teeth 18 are concerned, the shaping circuit 26 transforms them in the same manner into a signal with steep edges, having a time which is exactly twice that of the signals pertaining to the other teeth. The signals 28 are applied to a stage 30 for the measurement and the calculation of the instantaneous periods $d_i$ of passage of the real and virtual teeth of the measurement ring gear 12 before the sensor 22.

The measurement and calculation stage 30 comprises counting circuits which receive high-frequency timing pulses (10 MHz, for example) produced by a quartz clock 32 and it delivers at the output numerical values which are representative of the number of clock pulses counted between two low-high transitions of the signals with steep edges produced by the shaping stage 26. As far as the processing of each signal 28 produced by one of the long indexing teeth 18–20 is concerned, in the context of the described example, its value will be divided by two (one-bit shift), and the result will be assigned to the corresponding virtual teeth. In this manner, the stage 30 for the measurement and calculation of the periods $d_i$ sends a successive series of thirty numerical values $d_i$ to a buffer memory 34, which are respectively associated with thirty consecutive numbers ranging from 0 to 29 defining the rank i of each of the real or virtual teeth within a measurement horizon.

The buffer memory 34 is connected to a calculation stage 36 which is adapted for regrouping the thirty instantaneous times $d_i$ between two reference teeth in sets of fine. In this manner, the stage 36 successively produces six passage times of five teeth-reference sets, respectively bearing the numbers $du_0, \ldots, du_5$ as they are produced. These six times and their six rank numbers are represented in line I of FIG. 3. These times and these numbers are then transmitted to a buffer memory 38 which is placed under the control of a transfer control stage 40 which is also adapted for receiving the times $du_0, \ldots, du_5$, and identifying the rank of the time $du_0$.

The buffer memory 38 is adapted to contain three successive series of six times of sets-references: a central series which defines the measurement horizon during the analysis, a front series which precedes the central series in time and a rear series which follows it. When a new time $du_0$ arrives, the transfer control stage 40 is adapted so as to transfer to the following stages the six reference times $du_0, \ldots, du_5$ of the central series as well as, under the reference $du_{-1}$, the time $du_5$ of the last set of the preceding series and, on the reference $du_{+1}$, the time $du_0$ of the first set of the series which has just arrived. This is represented in line II of FIG. 3.

A first calculation step 42 which receives these eight successive times is programmed so as to select the six reference times $du_0, \ldots du_5$ and to calculate from them the sum, which is the instantaneous period T of an angular range of combustions. Each new value T so calculated is addressed to a buffer memory 44 where it replaces the value calculated earlier.

A second calculation step 46, which receives these eight successive times $(du_{-1}, du_0, \ldots, du_5, du_{+1})$ is programmed to select the four following times: $du_0, du_2, du_3$ and $du_5$, and $du_5$, and to combine them according to the relation represented with the signs and the weightings in line II of FIG. 3:

$Q=(du_0-du_2+du_5-du_3)$.

A third calculation stage 47 which receives the same eight times is programmed to select the four time $du_{-1}, du_0, du_5$ and $du_{+1}$ and to combine them according to the relation: $q=\delta u=(du_0-du_{-1}+du_5-du_{+1})$.

The terms Q and q so calculated are addressed to a buffer memory 48 where they remain until new values of Q and q arrive. The buffer memory 48 is connected to a fourth calculation stage 50 which also receives from a memory 52 the weighting constant $p=a=\pi/2\sqrt{3}$. The calculation stage 50 is adapted for calculating the sum $Q_c=Q+q$, and then the product $D_c=p \cdot Q_c$, and to apply it to a fifth calculation stage 54.

This calculation stage 54 also receives from a memory 56, two constants, A and B, experimentally determined and, from the buffer memory 44, the term T. From these four magnitudes, the stage 54 calculates the mean gas torque, corrected for low-frequency perturbations according to the relation $Cg_c=A \cdot D_c/T^3+B/T^2$. As a consequence of what has been said above, it should be noted that this value $Cg_c$ so calculated applies only to two- or four-cylinder engines, in which high or low dead center occurs with every turn or every half turn of the crankshaft, depending on whether the engine is a two-stroke or four-stroke engine. For engines with six or eight cylinders, for example, the correction of the mean gas torque for at low-frequency perturbations will no longer be possible. In this case, the buffer memory 38 will be limited to a series of six sets of teeth-references and the calculation stage 42 will be adapted so as to perform only the calculation of $Q=(du_0-du_2-du_3+du_5)$.

With $Q_c=Q+q$, the correct mean gas torque $Cg_c$, calculated as indicated above, comprises two elements, that is the torque Cg measured according to the simplified relation using the term $Q=(du_0-du_2-du_3+du_5)$ and a correction $\delta Cg$ applied to this torque Cg so measured, using the term $q=(du_0-du_{-1}-du_{+1}+du_5)$.

Consequently, the precision of the measurement of the torque Cg, which is carried out from the simplified relation using the term Q, is replicated entirely in the measurement of the torque $Cg_c$ corrected for low-frequency perturbations. In contrast, this is not the case with perturbations at frequencies which are much higher than the frequencies of the combustions. For these high-frequency perturbations, neither the initial calculation procedure nor the simplified calculation procedure according to the first object of the present invention allows their correction, the simplified calculation procedure being in that case worse than the initial calculation procedure. These different results clearly appear in FIG. 2 which represents the frequency response of the two terms D calculated respectively according to the two procedures in question. Indeed, these frequency responses are identical up to four times the frequency of a measurement horizon 2Ωo (Ωo being the frequency of rotation of a four-stroke, four-cylinder engine). At higher frequencies, the frequency response of the term D, obtained using the simplified calculation procedure, presents amplitude maxima which are much greater than those of the term D obtained by the initial calculation procedure. This signifies that the high-frequency perturbations are taken more into account by the simplified calculation procedure than by the initial procedure.

Figure 2:
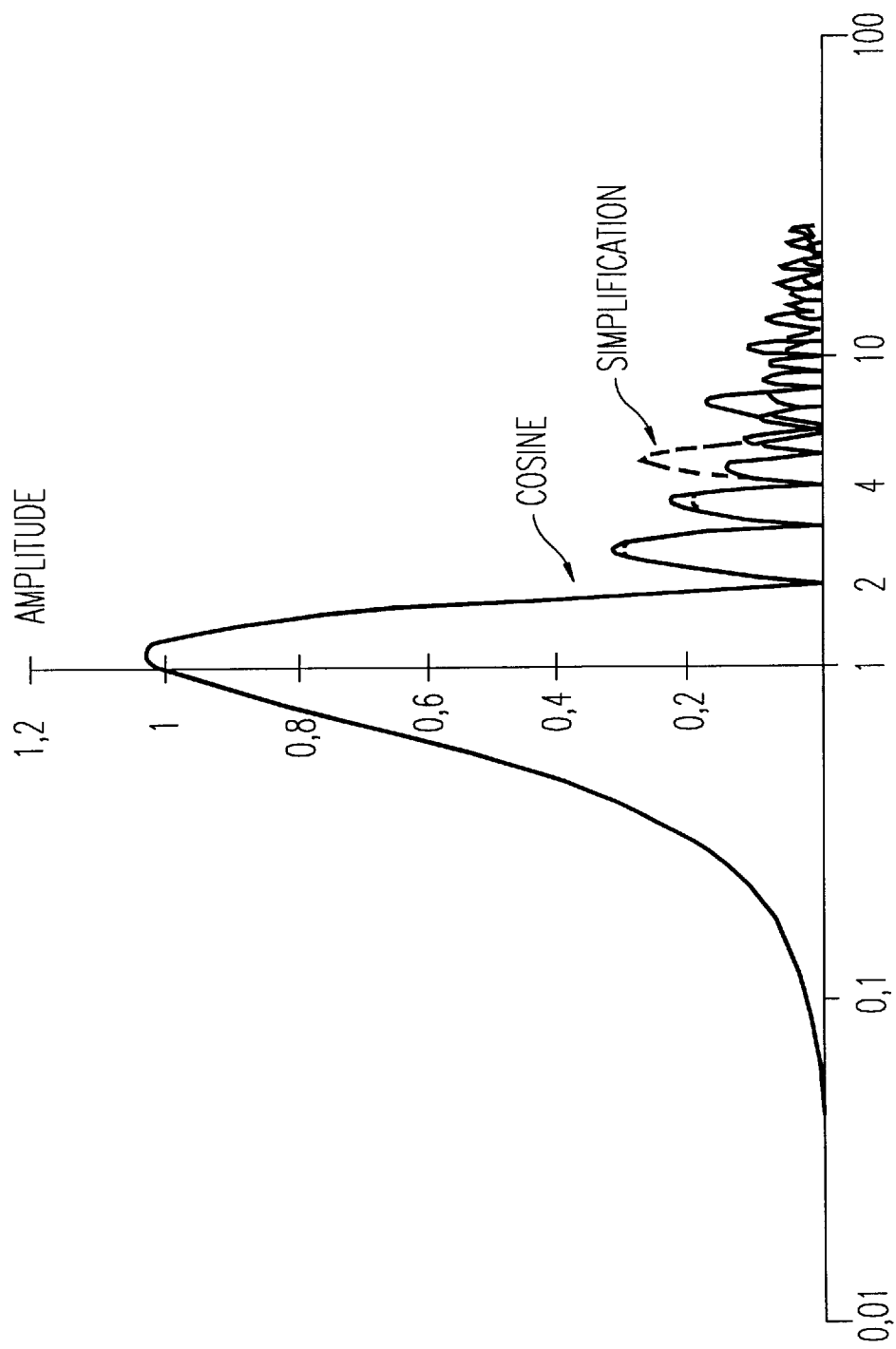
FIG. 2 represents the frequency responses of the two D terms, calculated by means of the initial relation and the simplified relation, respectively.

According to this FIG. 2, it is verified that the magnitude Q has a nonzero frequent frequency at the analysis frequency of the explosions of the engine, and a nonzero frequency response at zero frequency, that is a zero value for a strictly constant speed of rotation of the engine, which is essential for the quality of the approximation D=pQ.

In an embodiment variant of the method, the measurement horizon is equal to the horizon defined earlier, increased by an additional set $du_6$, for example, $du+1$, the term Q in that case being equal to $Q=du_0-du_3+3/2 \cdot (du_6-du_4)$. This second form has the advantage of improve discrimination between late combustions and combustion misses of the engine.

The term q is still provided by the relation $q=\delta u=(du_o-du_{-1}+du_5-du_{+1})$, however, the weighting constants a and p used for the calculation of Dc are then different, a remaining equal to $\pi/2\sqrt{3}$ and p assuming a value which is determined experimentally.

As indicated in the preamble of the present description, the formula used for the calculation of the mean gas torque, that is $Cg=A \cdot D/T^3+B/T^2$, is only valid for engines in low-level operating conditions. In the case of an engine in high-level operating conditions, a correction must be applied to the coefficient A in question, as indicated in the patent referred to in this preamble. For this purpose, the coefficient A is replaced by $A_c=A(1-z)$ where $z=(fi/fr)^2$. In this equation $fi=1/T$, the instantaneous frequency of the combustions and fr is the torsional resonance frequency of the shaft/inertial flywheel connection. To apply this correction in the context of the present invention, the memory 56 will contain the constant term fr and the calculation stage 54 will calculate $fi=1/T$ and then $z=(fi/fr)^2$ and then $A_c=A(1-z)$, and then, finally, the desired value $Cg_c=A_c \cdot D/T^3+B/T^2$, which, in this case, is both valid for low- and high-level operating conditions of the engine and correct for low-frequency perturbations.

Figure 3:
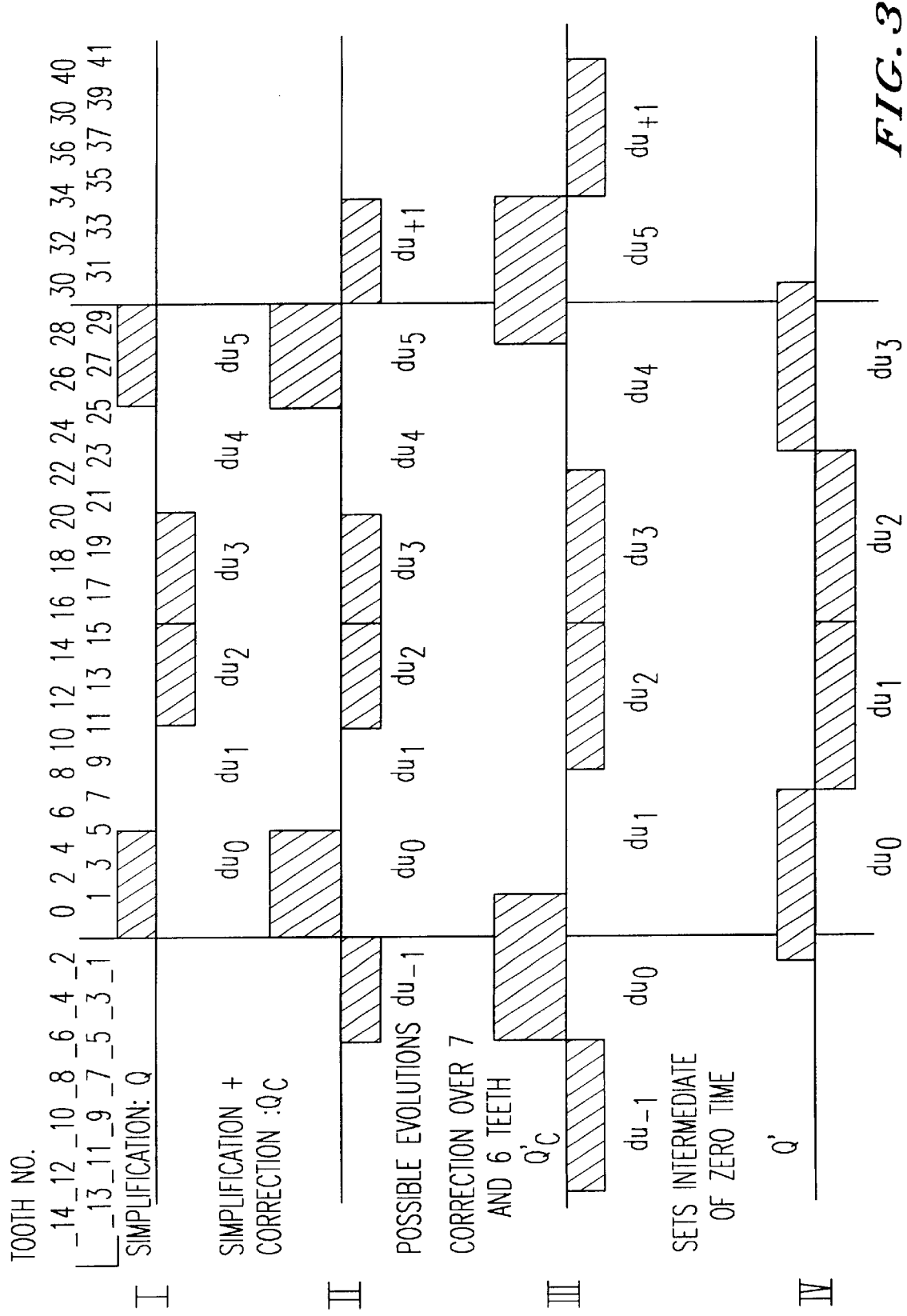
FIG. 3 represents four implementation and operation waveforms of teeth-references packet times.

The invention is not limited to the embodiment described with reference to FIG. 1 and to lines I and II of FIG. 3. Indeed, it is possible to replace the eight weighted times of the sets-references of line II of FIG. 3 by the eight other weighted times of line III of the same figure. In this case, the times which are not taken into account in the calculation of $Q'_c$, that is, $du_1$ and $du_4$, concern six teeth and the other times, seven teeth. Consequently, the times $du_0$ and $du_5$ each concern two teeth within the angular range separating two consecutive high dead centers and five teeth outside of this range. The relation connecting $Q'_c$ to the times $du_{-1}, du_0, \ldots, du_5, du_{+1}$, represented in line III of FIG. 3, is the same as that connecting $Q_c$ to these same times represented in line II of this figure. These two relations are illustrated with the signs and weightings in these lines II and III. Similarly, in line IV of FIG. 3, a continuous series is represented, of four times of sets-references $du_0, \ldots, du_3$ each concerning eight teeth, the times $du_0$ and $du_5$ each including one tooth outside the angular range separating two consecutive high dead centers.

In the case of line III of FIG. 3, the number of sets teeth taken into account and those sets not taken into account, as well as the weightings and the signs of the times of sets taken into account are determined so that the simplified calculation term $Q'=(du_0-du_2-du_3+du_5)$ presents a nonzero mean value during one measurement horizon and a nonzero frequency response at the frequency of this horizon. A constant weighting coefficient p' is then applied to the term Q' so that the frequency response of the term $D=p' \cdot Q'$ at the frequency of the measurement horizon is identical to that supplied for this term D obtained by the initial calculation procedure. The three parameters indicated above (numbers of teeth, weightings and signs of the sets) are also determined so that the frequency response of the term $D=p' \cdot Q'$ at frequencies greater than the measurement horizon frequency is as low as possible. Moreover, for the calculation of the term q' for correction of the low-frequency perturbations, the expression defining q' is identical to that of q indicated above, and the numbers of the teeth of the sets whose times are referenced by $du_{-1}$ and $du_{+1}$ are the same as those of the times referenced $du_0$ and $du_5$, as appears in line III of FIG. 3.

All the above considerations, which concern Q' and p', apply to the entire embodiment presented in line IV of FIG. 3, the value of Q' then being $Q'=(du_0-du_1-du_2+du_3)$ In the two cases illustrated in lines III and IV of FIG. 3, the preparation of the necessary magnitudes for the calculation of the angular period T of the combustions of the engine will be modified to take into account the fact that the measurement horizon extends beyond both sides of the angular range concerned. This preparation will consist in calculating in addition to the times necessary for the calculation of Q' and $Q'_c$, times $du_{0t}$ and $du_{5t}$ (for the example of line III) or $du_{3t}$ (for the example of line IV) which are times $du_0$, $du_5$ and $du_3$ which have been truncated and limited only to those teeth within this angular range. For this purpose, the stage 36 for the measurement of the times of the sets and for the identification of their ranks described above will calculate in addition these truncated times and assign an adequate identification to them. The stage 42 for the calculation of the period T will be programmed accordingly.

In a variant, it is noted that the two sets of times $du_2$ and $du_3$ in the case of lines I, II and III of FIG. 3, and those of times $du_1$ and $du_2$ in the case of line IV, can be grouped into a single set by the stage 36. The calculations of T and of $Q_c$, which follow, will be modified accordingly.

It is noted that the angular range defining the width of the sets of rank 0 and m' determines the precision of the measurement of $\delta Cg$. When this range is relatively small, this precision decreases. When it becomes relatively large, the measurement becomes sensitive to the pressures in the cylinders. This is due to the fact that the lever arms of the connecting rods are no longer negligible and, in this case, the set of rank m' of the measurement horizon analyzed before (its time is reference $du_{-1}$) and that of the rank 0 of the following horizon (its time is reference $du_{+1}$) are at a significant distance from the two consecutive high dead centers which determine the theoretical boundaries of the measurement horizon during an analysis. To correct this negative effect of the broadening of the sets of rank 0 and m', it is possible to introduce a slight angular shift of the measurement horizon during an analysis by slightly advancing beyond the boundaries of this measurement horizon with respect to the two high dead centers which define them theoretically. The purpose of this is to gain some distance from the effects of the combustion.

It is recalled that the calculation of the negative quality factor $\delta Cg$ of the torque $Cg$ can be carried out regardless of how the term $Cg$ is calculated, in the simplified or unsimplified form, and that, in addition, it can be made available, as is to the user. For this purpose, an additional calculation stage 55 will be provided which receives a from the memory 52, q from the memory 48, A from the memory 56 and T from the memory 44, and which calculates $\delta Cg = a \cdot q \cdot A/T^3$.

Figure 4:
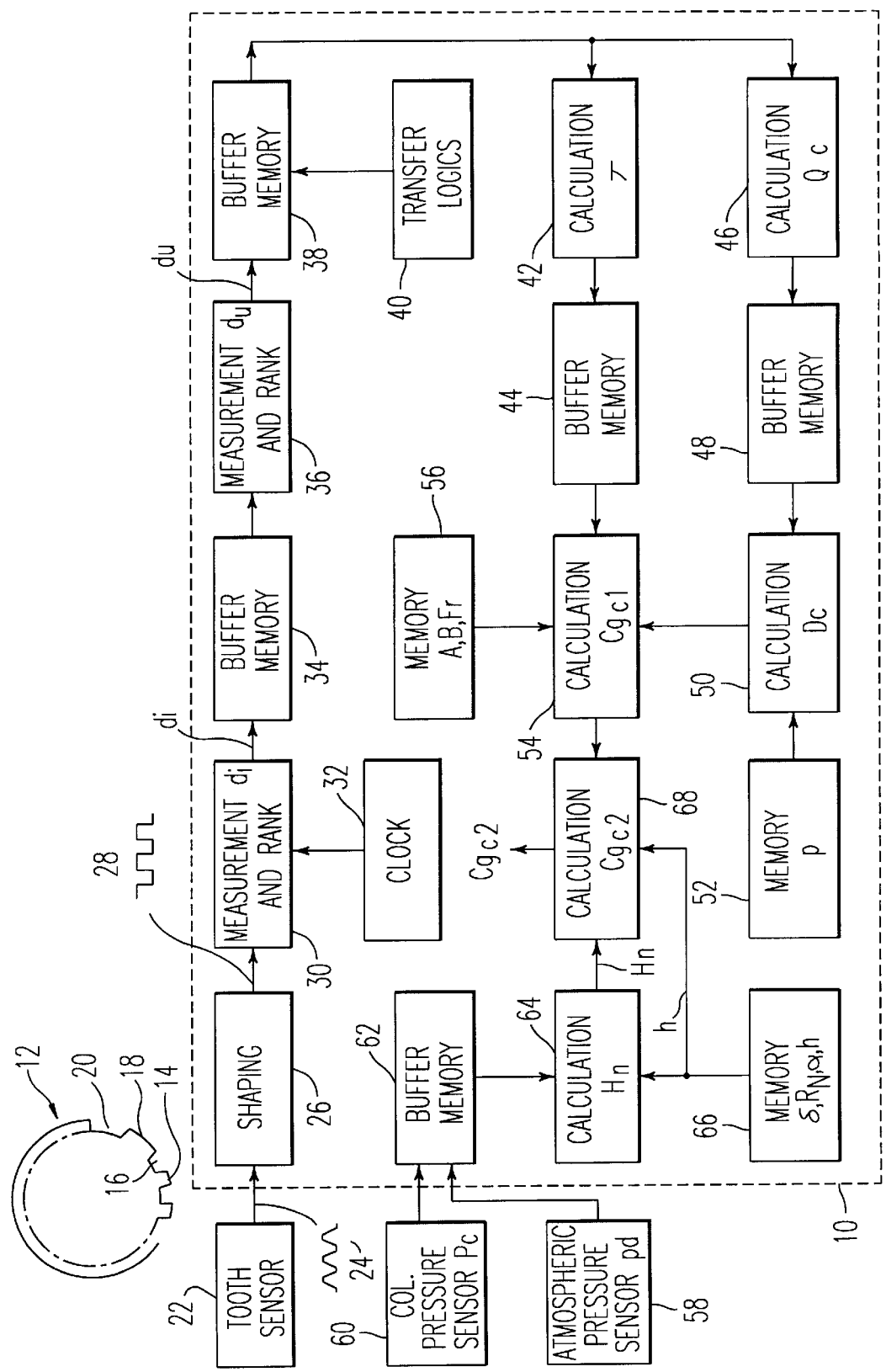
FIG. 4 represents the diagram of the different elements which constitute a second embodiment of a device for measuring the torque of an engine, according to the invention.

A circuit 10 is represented in FIG. 4 for the measurement of the corrected mean gas torque in a first step of the low- and high-frequency perturbations produced by each combustion of the gaseous mixture in a four-stroke, four-cylinder combustion engine operating at low and high operating conditions ($Cg_{c1}$) and, in a second step, of the perturbations affecting the measurement because of the particular conditions of the combustions in the engine ($Cg_{c2}$).

For this purpose, a toothed measurement ring gear 12 is mounted, with integral connection, on the inertial flywheel of an engine with electronic ignition. For example, the ring gear 12 comprises, on its periphery, fifty-six identical, regularly spaced, teeth, such as those formed by the full part 14 and the hollow part 16, distributed into two series of twenty-eight teeth separated by two diametrically opposite reference teeth, such as the tooth formed by the solid part 18 and the hollow part 20, which have a width that is twice of that of the other teeth. Indeed, the ring gear 12 comprises $(2 \times 28 + 2 \times 2) = 60$ equidistant references consisting of real or virtual teeth of the same module. The two diametrically opposite broad teeth serve as reference or origin of indexation to allow the numbering of each of the teeth and especially to identify the tooth $d_0$ which will be defined below.

With the four-strokes, four-cylinder combustion engine mentioned above, it is immediately noted that the angular period of the combustions concerns thirty teeth and is equal to half the period of rotation of the crankshaft.

A fixed sensor 22 is associated with the ring gear 12, for example, one with variable reluctance, which is adapted for the delivery of an alternating signal 24 with a frequency proportional to the rate of passage of the teeth of the ring gear, that is proportional to the instantaneous speed of the flywheel.

The angular position of this sensor 22 with respect to the indexing teeth 18 at the time when the piston of a cylinder is at top dead center is known or determined. This allows the identification of the tooth $d_0$ as the one which passes before the sensor during the passage of the piston of the given cylinder at its high dead center of combustion. The signal delivered by the sensor 22 is applied to the input of a shaping circuit 26 which is adapted for the delivery of signals 28 with steep edges, having a time equal to the instantaneous period $d_i$ of the incident signals 24, the index i varying from 0 to 29 as the teeth pass before the sensor. Each period $d_i$ of the signal so produced corresponds to the passage time of a tooth, either a solid part or a hollow part, before the sensor 22. As far as the incident signals produced by the reference teeth 18 are concerned, the shaping circuit 26 transforms them in the same manner into a signal with steep edges, having a time that is exactly twice that of the signals assigned to the other teeth. The signals 28 are applied to a stage 30 for measurement and calculation of the instantaneous periods $d_i$ of passage of the real and virtual teeth of the measurement ring gear 12 before the sensor 22.

The measurement and calculation stage 30 comprises counting circuits which receive high-frequency timing pulses (10 MHz, for example) produced by a quartz clock 32, and it delivers numerical values at the output which are representative of the number of clock pulses counted between two low-high transitions of the signals with steep edges produced by the shaping stage 26. As far as the processing of each signal 28 produced by one of the long indexing teeth 18–20 is concerned, in the context of the described example, its value will be divided by two (one-bit shift) and the result will be assigned to the two corresponding virtual teeth. In this manner, the stage 30 for the measurement and the calculation of the periods $d_i$ addresses to a buffer memory 34 successive series of thirty numerical values $d_i$, respectively associated with thirty consecutive numbers ranging from 0 to 29 defining the rank i of each of the real or virtual teeth within a measurement horizon.

The buffer memory 34 is connected to a calculation step 36 which is adapted for regrouping, in sets of five, the thirty instantaneous times $d_i$ between two reference teeth. In this manner, the stage 36 successively produces six passage times of five teeth-reference sets, respectively numbered $du_0, \ldots, du_5$ as they are produced, the angular value of each set being $\pi/6$, these times and numbers are then transmitted to a buffer memory 38 placed under the control of a transfer control stage 40 which is also adapted to receive the times $du_i$.

The buffer memory 38 is adapted for containing three successive series of six times of sets-references: a central series which defines the measurement horizon during an analysis, a front series which precedes this central series in time and a rear series which follows it. At the arrival of a new time duo, the transfer control stage 40 is adapted for transferring to the following stages the six times referenced $du_0, \ldots, du_5$ of the central series as well as, under the reference $du_{-1}$, the time $du_5$ of the last set of the front series and, under the reference $du_{+1}$, the time $du_0$ of the first set of the series which has just arrived.

A first calculation stage 42, which receives these eight successive times, is programmed to select the six times referenced $du_0, \ldots du_5$ and to calculate their sum, which is the instantaneous period T of an angular range of combustions. Each new value T so calculated is addressed to a buffer memory 44 where it replaces the value calculated previously.

A second calculation stage 46 which receives these eight successive times $(du_{-1}, du_0, \ldots, du_5, du_{+1})$ is programmed to select the six following times: $du_{-1}, du_0, du_2, du_3, du_5$ and $du_{+1}$ and to combine them according to the relation:

$$Qc = 2du_0 - du_2 + 2du_5 - du_3 - du_{+1}.$$

The term $Q_c$ so calculated is addressed to a buffer memory 48 where it remains until a new value of $Q_c$ arrives. The buffer memory 48 is connected to a third calculation stage 50 which also receives from a memory 52, the weighting constant $p = \pi/2\sqrt{3}$. The calculation stage 50 is adapted for the calculation of the product $D_c = p \cdot Q_c$ and for its application to a fourth calculation stage 54.

This calculation stage 54 also receives two constants A and B from a memory 56, which are experimentally determined and the term T from the buffer memory 44. From these two magnitudes, the stage 54 calculates the gas torque, corrected for low-frequency perturbations, according to the equation $Cg_c = A \cdot D_c/T^3 + B/T^2$. The torque $Cg_c$ so obtained is corrected for low-frequency perturbations.

As mentioned in the preamble of the present description, the formula used for the calculation of the mean gas torque, that is $Cg=A \cdot D/T^3+B/T^2$ is only valid for engines operating at low-level condition. In the case of an engine operating at high-level conditions, a correction must be applied to the coefficient A in question, as indicated in U.S. Pat. No. 9,111,273 referred to in the preamble. For this purpose, the coefficient A is replaced by $A_c=A(1-z)$ with $z=(fi/fr)^2$. In this relation $fi=1/T$, the instantaneous frequency of the combustions, and fr is the torsional resonance frequency of the shaft/inertial flywheel connection. To use this correction in the context of the present invention, the memory 56 will contain the constant term fr and the calculation stage 54 will calculate $fi=1/T$ and then $z=(fi/fr)^2$ and then $A_c=A(1-z)$, and then, finally, the desired value $Cg_c=A_c \cdot D/T^3+B/T^2$, which, in that case, will be valid both for high- and low-level operating conditions of the engine and corrected for low-frequency perturbations.

According to the present invention, the embodiment represented in FIG. 4 comprises, in addition, a sensor 58 which senses the atmospheric pressure Pa, a pressure sensor 60 Pc in the air-intake manifold, and a buffer memory 62 to which are applied the data produced by the pressure sensors 58–60. These two pressure sensors will be, for example, of the type with strain gauge diffused in a silicon chip. First, they produce an analog magnitude which is representative of the pressure measured. This magnitude is then converted into a numerical value by an incorporated analog/digital converter before being applied to the buffer memory 62. This buffer memory 62 is adapted for holding at any time three successive measurements of the pressure Pc made during the course of three successive combustion intervals. These measurements are the last measurement received $Pc_{(n')}$ and the two preceding measurements $Pc_{(n'-1)}$ and $Pc_{(n'-2)}$, each measurement being identified by its rank n', (n'-1) or (n'-2). The buffer memory 62 is placed under the control of a calculation stage 64 which communicates the four pressure data which it contains to it. The calculation stage 64 is adapted for the calculation of the term $$H_{n'}=-\delta \cdot R_{N'}(Pc_{(n'-2)}+Pc_{(n'-1)}+\alpha \cdot (Pc_{(n'-2)}-Pa)$$

from three of the four above-mentioned pressure data elements and three constants $\delta$, $R_N$ and $\alpha$ stored in a permanent memory 66. The values of these constants have been indicated above.

A last calculation stage 68 receives, on the one hand, the value $Cg_{c1}$ produced by the calculation stage 54 and, on the other hand, the value of the term $H_{n'}$ calculated by the calculation stage 64 as well as a constant h which is also stored in the memory 66. The calculation stage 68 is adapted for the calculation of the desired value $Cg_{cn'2}$ according to the relation $$Cg_{cn'2}=h \cdot Cg_{cn'1}+H_{n'}.$$

As indicated above, the magnitude $Cg_{n'2}$ thus obtained is the completely corrected numerical value of the torque of a four-stroke, four cylinder internal combustion engine of injection, which operates at low- and high-level operating conditions, this value being in fact also corrected for low-frequency perturbations which affect the engine as well as for errors caused by the particular conditions of the combustions in the engine (rate of recirculation of the exhaust gases, rate of residual gases, excess of fuel and transitory regimens). As indicated above, the invention can be implemented using a measurement of the air flow rate of the collector, instead of a pressure measurement. The particular means of production of this variant are represented in FIG. 5.

Figure 5:
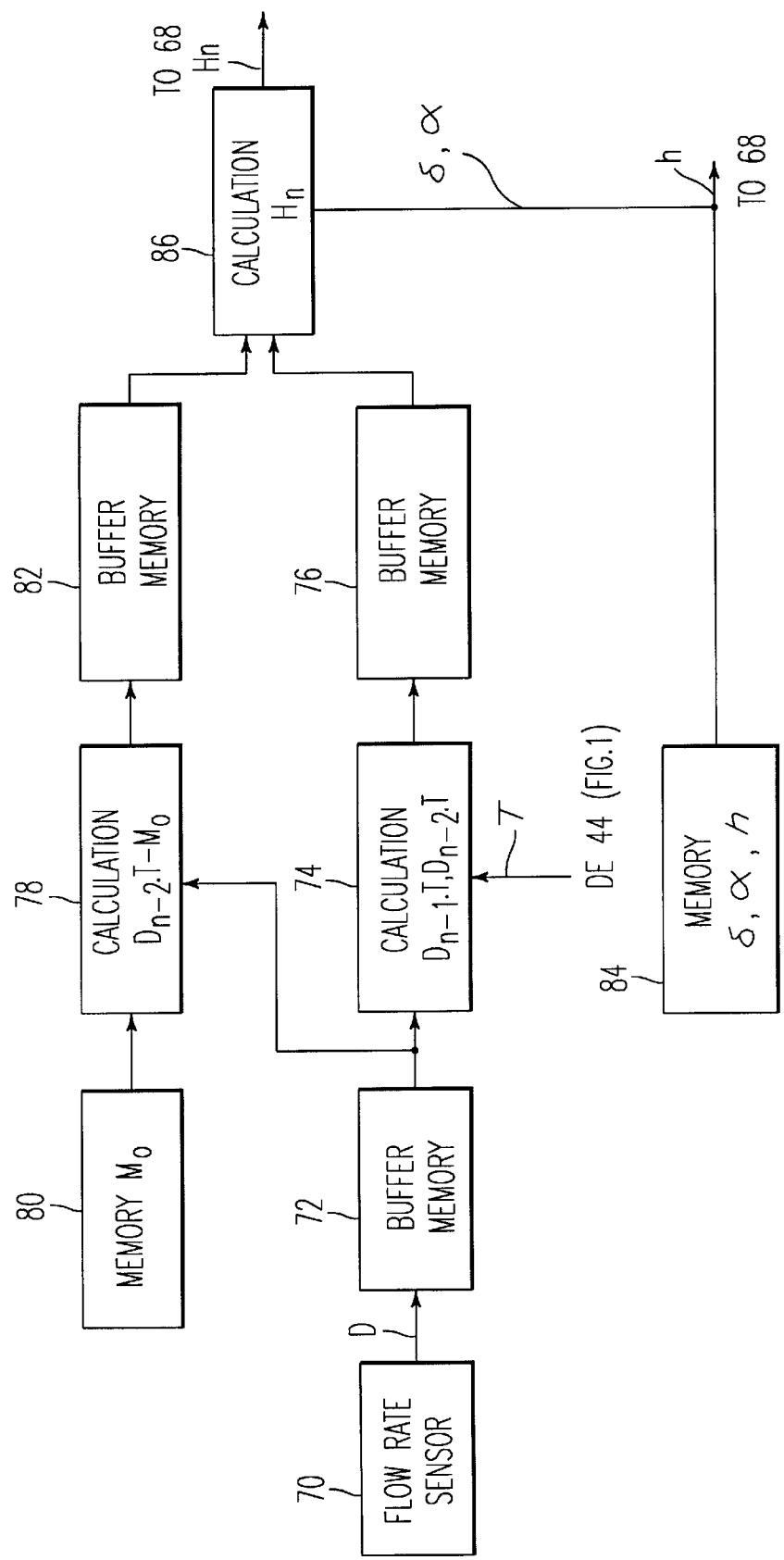
FIG. 5 represents the diagram of the elements specific to a third embodiment of the invention.

According to FIG. 5, a mass flow sensor 70 is placed in the air-intake manifold. This sensor 70 will be, for example, of the type with hot wire or with embedded elastic blade at one end. The sensitive elements of these sensors are mounted in a bridge, so as to produce first an analog signal, which is then transformed into a digital value incorporated analog/digital converter. This digital value is then applied to a buffer memory 72, which is adapted for holding at any time three data elements $D_{n'}$, $D_{n'-1}$ and $D_{n'-2}$, which are representative, respectively, of the air flow rates in the intake manifold, during the combustion interval of rank n' during the course of an analysis, and of the two combustion intervals which precede it. The data stored in the buffer memory 72 is applied to a calculation stage 74 which also receives from the buffer memory 44, the period T of the combustion interval during an analysis (this period is practically constant over the three successive periods concerned). The calculation stage 74 is adapted for the successive calculation of the terms $(D_{n'-1} \cdot T)$ and $(D_{n'-2} \cdot T)$ and for applying them to a buffer memory 76. The two latter terms are respectively $M_{n'-1}$ and $M_{n'-2}$, as already indicated above (recalling that T=½N). Moreover, the data element $D_{n'-2}$ stored in the buffer memory 72 is applied to a calculation stage 78 adapted for calculating $(D_{n'-2} \cdot T-M_0)$ from $D_{n'-2}$ and from $M_0$, the air mass introduced into a cylinder for a fully opening butterfly valve, which is a measured constant, stored in a permanent memory 80. The term $(D_{n'-2} \cdot T-M_0)$ so calculated is $Cp_{(n'-2)}$. This term is then applied to a buffer memory 82.

The constant terms $\delta$, $\alpha$ and h defined above are stored in a permanent memory 84. The terms $(D_{n'-1} \cdot T)$ and $(D_{n'-2} \cdot T)$ stored in the buffer memory 76, the term $(D_{n'-2} \cdot T-M_0)$ stored in the buffer memory 82 and the constants $\delta$ and $\alpha$ stored in the permanent memory 84 are applied to the calculation step 86 which is adapted for the derivation of the above-mentioned term $H_{n'}$. In this stage 86, the relation expressing $H_{n'}$ is:

$$H_{n'}=-\delta \cdot (D_{n'-1} \cdot T+D_{n'-2} \cdot T)+\alpha \cdot (D_{n'-2} \cdot T-M_0)$$

This relation is equivalent to the one used above with data representative of the pressures in the air collector and of the atmospheric pressure.

During the period of analysis of rank (n'-2), data is produced, $Pc_{(n'-2)}$ and $D_{(n'-2)}$, which allow, on the one hand, the calculation of the pumping torque $Cp_{(n'-2)}$ of the cylinder which will be in release during the period of analysis of rank n' and, on the other hand, the air mass $M_{(n'-2)}$ which will participate in the combustion effected during this period of rank n'. During the period of analysis of rank (n-1), data $Pc_{(n'-1)}$ or $D_{(n'-1)}$ are produced which allow the calculation of the compression torque of the cylinder during compression, during the period of analysis of rank n', which will be in release during the period of analysis of rank (n'+1); this compression torque is proportional to $M_{(n'-1)}$.

This pumping torque and this compression torque, as well as this air mass participating in the combustion during the period of analysis of rank n' are directly dependent on the particular conditions of the combustions. Taking them into account allows the correction for the effects on the Cg of the rate of recirculation of the exhaust gases, of the rate of residual gases burned, of the excess fuel and of the transitory operating conditions of the engine.

The invention is not limited to the described examples. As a variant, it is possible to calculate Cg from the general relation defining D, instead of from the simplified relation used in the described example. Similarly, it will be possible, in some cases, not to use the corrections pertaining to the low-frequency perturbations and/or the corrections concerning the high-level engine operating conditions. Moreover, to take into account the limited variations in the filling coefficient of the cylinders as a function of the speed of rotation of the engine, a correction circuit receiving the mean value R of this coefficient and the period of the combustions T can be provided, which will produce $R_N$ from determined experimentally mapping. Such a circuit will be placed between the memory 66 and the calculation stage 64.

We claim:

1. Method for the production of a digital value Cg which is representative of the mean gas torque generated by each combustion of the gas mixture in the cylinders of a combustion engine, the combustion engine includes measurement references arranged on a ring gear which is integrally connected to an inertial flywheel of the combustion engine or its crankshaft, means to define at least one reference for indexing the measurement references, a sensor to sense the passage of the measurement references, which is fixedly mounted in a vicinity of the ring gear, said method comprising the steps of:

producing a primary digital value $d_i$ which is representative of an instantaneous passage of time sensed by the sensor of each of the measurement references;

deriving, from the primary digital values $d_i$, a first secondary digital value T, which is representative of the total passage of time before the sensor of each series of n references defining an angular range of the combustions in the combustion engine;

deriving a second secondary digital value D, which is representative of a projection onto a phase reference line of the means to define at least one reference for indexing the measurement references, corresponding to an origin of the angular range of the combustions, of an amplitude of an alternating component of the instantaneous passage times di of the measurement references sensed by the sensor at a frequency of the combustions in the combustion engine;

deriving the desired numerical value Cg from the relation $Cg = A \cdot D/T^3 + B/T^2$ in which A and B are experimentally determined constants;

establishing a measurement horizon equal to at least the angular range between two consecutive explosions in the combustion engine;

regrouping the instantaneous passage times di of the references within this measurement horizon in a relatively small number of passage times $du_0, \ldots, du_m$ of reference sets and of identifying these times du by the rank 0 ... m in each measurement horizon during the course of an analysis;

combining together by addition and subtraction, possibly weighted, a given number of times having determined ranks, so as to produce a magnitude Q having a mean value which is equal to zero and a frequency response which is nonzero at the analysis frequency of the combustion engine explosions; and determining the weighting constant p such that the term $D = p \cdot Q$ obtained by a simplified calculation has a frequency response, at least for said frequency of analysis and for the combination of the times used to express Q, which is essentially identical to that obtained by the term:

$$D = \sum_{0}^{(n-1)} d_i \cdot \cos(i \cdot 2\pi/n).$$

2. Method according to claim 1, wherein the number of reference sets within a measurement horizon is an even number, and wherein an angular length of these sets are equal, and wherein the number of passage times of reference sets combined to produce Q is a even number equal to at least four.

3. Method according to claims 1 or 2, wherein the frequency response of the term $D = p \cdot Q$ is equal to or less than four times said analysis frequency, which is essentially identical to that initially obtained.

4. Method according to claim 1, wherein the measurement horizon includes a small number of references located on both sides of the angular range between two consecutive explosions in the combustion engine.

5. Method according to claim 1, wherein the reference sets of a measurement horizon do not have exactly the same length.

6. Method according to claim 1, wherein the measurement horizon is exactly defined by the angular range separating two explosions in the combustion engine, and wherein the number of reference sets is six, and the six measured times referenced are $du_0, \ldots, du_5$, and the magnitude $Q = (du_0 - du_2 - du_3 + du_5)$ and the weighting constant $p = \pi 2\sqrt{3}$, when the fixed sets have the same angular length $\pi/6$.

7. Method according to claim 1, wherein the angular range between two consecutive explosions is cut into six sets of identical angular length, and wherein the measurement horizon is equal to seven consecutive reference sets $du_0 \ldots, du_6$, and wherein the magnitude Q is equal to $Q = du_0 - du_3 + 3/2 \cdot (du_6 - du_4)$.

8. Method for the production of a first numerical value Cg which is representative of the mean gas torque generated by each combustion of the gaseous mixture in the cylinders of a combustion engine and a second numerical value δCg which is representative of the variations of resistant torque applied to a two- or four-cylinder engine, the combustion engine includes measurement references arranged on a ring gear which is integrally connected to an inertial flywheel of the combustion engine or its crankshaft, means to define at least one reference for indexing the measurement references, a sensor to sense the passage of the measurement references, mounted in the vicinity of the ring gear, said method comprising the steps of:

producing a primary numerical value $d_i$ which is representative of an instantaneous passage of time sensed by the sensor of each of the measurement references;

deriving, from the primary numerical values $d_i$, a first secondary numerical value T which is representative of the total passage of time before the sensor of each series of n references defining an angular range of the combustions in the combustion engine;

deriving a second secondary numerical value D, which is representative of a projection on a phase reference line of the means to define at least one reference for indexing the measurement references, corresponding to an origin of the angular range of the combustions, of an amplitude of an alternating component of the instantaneous passage times di the measurement references sensed by the sensor at a frequency of the combustions in the combustion engine;

deriving the desired numerical value Cg from the relation $Cg = A \cdot D/T^3 + B/T^2$ in which A and B are experimentally determined constants; and wherein the method for the production of said second value δCg comprises the sub-steps of establishing a measurement horizon equal to at least the angular range between two consecutive explosions in the combustion engine, regrouping the instantaneous passage times di of the references within this measurement horizon in a relatively small number of passage times $du_0, \ldots, du_{m'}$ of reference sets and in identifying these times du by the rank $0 \ldots m'$ in each measurement horizon during the course of an analysis, the angular values of the time sets of rank $0$ and m' being equal, assigning the reference $du_{-1}$ to the time of the last reference set of the last measurement horizon analyzed earlier and the reference $du_{+1}$ to the time of the first reference set of the next measurement horizon analyzed, combining four of these times du according to the relation $q=(du_0-du_{-1}+du_{m'}-du_{+1})$, and deriving the desired term δCg according to the relation $\delta Cg = a \cdot q \cdot A/T^3$, where A is a new constant dependent on the angular value of the four given reference sets.

9. Method according to claim 8, wherein the measurement horizon is exactly defined by the angular range separating two explosions in the combustion engine, and wherein the number of reference sets in the measurement horizon is six and the angular value of each set is π/6, and the constant $a = \pi/2\sqrt{3}$.

10. Method according to claim 8, wherein the angular range of the reference sets of times reference times $du_0$ and $du_{m'}$ is relatively large to produce a more precise term δCg, the measurement horizons present a slight phase lead with respect to the intervals of high dead centers of the combustion engine.

11. Method according to claims 6 or 8, wherein, to produce a term Q, corrected for low-frequency perturbations generated by variations of a resistant torque applied to the combustion engine, this term is calculated according to the relation:

$$Qc=(Q+q)=(2du_0-du_{-1}-du_2-du_3-du_{+1}+2du_5).$$

12. Method for the production of a numerical value $Cg_c$ which is representative of the mean gas torque, generated by each combustion of the gaseous mixture in the four cylinders of a four-stroke combustion engine, and corrected for the influences of the particular conditions of these combustions, said combustion engine includes measurement references arranged on a ring gear which is integrally connected to a flywheel of the combustion engine or its crankshaft, means to define at least one reference for indexing the measurement references, a sensor to sense the passage of the measurement references, mounted in a fixed manner in a vicinity of the ring gear, said method comprising the steps of:

producing a primary numerical value di which is representative of an instantaneous passage of time sensed by the sensor of each of the measurement references;

deriving, from the primary numerical values $d_i$, a first secondary numerical value T which is representative of the total passage of time before the sensor of each series of m references defining an angular range of the combustions in the combustion engine;

deriving a second secondary numerical value D, which is representative of a projection onto a phase reference line of the means to define at least one reference for indexing the measurement references, corresponding to an origin of the angular range of the combustions, of an amplitude of an alternating component of said instantaneous times $d_i$ at the frequency of the combustions in the combustion engine;

deriving an intermediate numerical value Cg from the relation $Cg = A \cdot D/T^3 + B/T^2$ in which A and B are experimentally determined constants;

measuring, especially in the air-intake manifold of the combustion engine, physical parameters which allow a determination of an air mass M pumped into a cylinder during the period of combustion of another cylinder, as well as a pumping torque Cp required for this purpose;

storing in a memory the values of these physical parameters or those of the magnitudes M and Cp, during the following two periods of combustion;

combining the data so stored in the memory to produce a term $H_{n'}$ for the correction of the torque $Cg_{n'}$ attributed to the period of combustion of rank n according to the relation $H_{n'} = -\delta(N_{n'-2}+M_{2n'-1})+\alpha \cdot Cp_{(n'-2)}$, where δ and α are constants which depend on the type of combustion engine; and calculating the corrected mean gas torque, generated during the period of combustion of rank n, according to the equation $Cg_{cn'} = h \cdot Cg_{n'}$, where h is a calibration constant which is dependent on the type of combustion engine.

13. Method according to claim 12, wherein determination of the air mass M includes measuring the pressure Pc in the air-intake manifold of the combustion engine and in calculating M according to the relation $M = Pc \cdot R_N$, where $R_N$ is the coefficient, which is essentially constant as a function of the speed N of the combustion engine, of filling of the cylinders of the combustion engine, and wherein determination of the pumping torque Cp includes measuring the atmospheric pressure Pa and in calculating Cp according to the relation $Cp=(Pc-Pa)$.

14. Method according to claim 12, wherein determination of the air mass M includes measuring the mass flow Da of the air in the manifold and in calculating M according to the relation $M = Da \cdot T$, where T is the period of the combustions, and wherein determination of the pumping torque Cp consists in calculating Cp according to the relation $Cp=(Da \cdot T - M_0)$, where $M_0$ is the air mass introduced into a cylinder by a fully opened butterfly valve.

15. Method according to one of claims 12, 13, or 14, wherein the term D of the relation defining Cg is obtained by the performance of the following steps:

establishing a measurement horizon equal to at least the angular range between two consecutive explosions in the combustion engine and dividing this measurement horizon in a relatively small number of reference sets;

calculating the passage times of each of these reference sets before the sensor and ranking them in each measurement horizon;

combining together, by addition and subtraction, a given number of times having predetermined ranks, so as to produce a magnitude Q having a zero mean value and a nonzero frequency response at the analysis frequency of the explosions of the motor; and determining a weighting constant p such that the term $D = p \cdot Q$ obtained by a simplified calculation has a frequency of response at least for said analysis frequency and for the combination of the times used to express Q, which is essentially identical to that obtained by a term $$\sum_{0}^{m-1} d_i \cdot \cos(i \cdot 2\pi/m).$$

16. Method according to claim 15, wherein the angular value of each reference set is $\pi/6$.

17. Method according to claim 15, further comprising a term $D_c = p \cdot Q_c$ corrected for the low-frequency perturbations which affect the combustion engine, each reference set measures $\pi/6$, the constant $p=\pi/2\sqrt{3}$ and the value of the term Q so corrected is $Q_c=(2du_0-du_{-1}du_2-du_3-du_{+1}+2du_5)$, with $du_{-1}$ and $du_{+1}$, the respective passage times of the sets arranged at a given instant on both sides of said angular range.

18. Device for the production of a numerical value Cg which is representative of the mean gas torque generated by each combustion of the gaseous mixture in the cylinders of a combustion engine at low-level operating conditions, the combustion engine includes measurement references arranged on a ring gear which is integrally connected to an inertial flywheel or a crankshaft of the combustion engine, means to define at least one reference for indexing the measurement references, a sensor to sense the passage of the measurement references which is mounted in a fixed manner in a vicinity of the ring gear, said device comprising:

calculation means to produce a primary numerical value $d_i$ which is representative of an instantaneous passage of time sensed by the sensor of each of the measurement references;

calculation means to derive from the primary numerical values $d_i$ a first secondary numerical value T which is representative of a total passage time before the sensor of each series of n references defining an angular range separating two consecutive combustions in the combustion engine;

calculation means to derive a second secondary numerical value D which is representative of a projection, onto a phase reference line of the means to define at least one reference for indexing the measurement references, corresponding to an origin of the angular range of the combustions, of an amplitude of an alternating component of the instantaneous passage times di of the measurement references sensed by the sensor at a frequency of the combustions in the combustion engine;

calculation means to derive the desired numerical value Cg from the relation $Cg=A\cdot D/T^3+B/T^2$ in which A and B are experimentally determined constants, contained in a memory;

processing and calculation means to establish a measurement horizon equal to at least said angular range, to regroup the instantaneous passage times $d_i$ of the references within this measurement horizon in a relatively small number of passage times $du_0, \ldots, du_m$ of references sets and to define these times du by their rank (0 ... m) in each measurement horizon;

calculation means to combine together, by addition and subtraction, a given number of set times having predetermined ranks, so as to produce a magnitude Q having a zero mean value zero and a nonzero frequency response at the analysis frequency of the explosions of the combustion engine;

calculation means to produce the term $D=p\cdot Q$ from the value Q calculated earlier and a weighting coefficient p determined experimentally and stored in a memory, the value of p and the combination of the times used to express Q having been determined so that the term D so obtained by simplified calculation has a frequency response, at least for said analysis frequency, which is identical to that obtained for the term:

$$\sum_{0}^{(m-1)} d_i \cdot \cos(i \cdot 2\pi/m).$$

19. Device to produce a first numerical value Cg which is representative of the mean gas torque generated by each combustion of the gas mixture in the cylinders of a combustion engine operating at low-level condition, and a second numerical value $\delta$Cg representative of the variations of the resistant torque applied to such an engine comprising two or four cylinders, said combustion engine includes measurement references arranged on a ring gear which is integrally connected to a flywheel or a crankshaft of the combustion engine means to define at least one reference for indexing the measurement references a sensor to sense the passage of the measurement references, which is mounted in a fixed manner in a vicinity of the ring gear, said device comprising:

calculation means to produce a primary numerical value $d_i$ which is representative of an instantaneous passage of time sensed by the sensor of each of the measurement references;

calculation means to derive from the primary numerical values $d_i$ a first secondary numerical value T which is representative of a total passage time before the sensor of each series of n references defining an angular range separating two consecutive combustions in the combustion engine;

calculation means to derive a second secondary numerical value D which is representative of a projection, onto a phase reference line of the means to define at least one reference for indexing the measurement references corresponding to an origin of the angular range of the combustions, of an amplitude of an alternating component of the instantaneous passage times $d_i$ of the measurement references sensed by the sensor at a frequency of the combustions in the combustion engine; and calculation means to derive the first desired numerical value Cg from the relation $Cg=A\cdot D/T^3+B/T^2$ in which A and B are experimentally determined constants contained in a memory, wherein said device to produce said second value $\delta$Cg further comprises, processing and calculation means to form a measurement horizon equal to at least one angular range between two consecutive explosions in the combustion engine, to regroup the instantaneous passage times $d_i$ of the references within this measurement horizon in a relatively small number of passage times $du_0, \ldots, du_m$ of reference sets and to identify these times du by the rank 0 ... m' in each measurement horizon during the course of an analysis, the angular values of the reference sets of the times of rank 0 and m' being equal, means to store in memory the times $du_0, \ldots, du_{m'}$ as well as, on the one hand, the time of last reference set of the last measurement horizon analyzed previously and to assign it the reference $du_{-1}$ and, on the other hand, the time of the first reference set of the next measurement horizon analyzed and to assign it the reference $du_{+1}$, means to produce a term q according to the relation $q=(du_0-du_{-1}+du_{m'}-du_{+1})$, and means to derive the desired term $\delta Cg$ according to the relation $\delta Cg = a \cdot q \cdot A/T^3$ where A is a constant which depends on the angular value of the four reference sets concerned.

20. Device for the production of a numerical value Cg which is representative of the mean gas torque generated by each combustion of the gaseous mixture in the four cylinders of a four-stroke combustion engine at low-level operating conditions, said value being corrected for influences of the particular conditions of these combustions, said combustion engine includes measurement references arranged on a ring gear which is integrally connected to an inertial flywheel or a crankshaft of the combustion engine, means to define at least one reference for indexing the measurement references, a sensor to sense the passage of the measurement references mounted in a fixed manner in a vicinity of the ring gear, said device comprising:

calculation means to produce a primary numerical value $d_i$ which is representative of an instantaneous time of passage time sensed by the sensor of each of the measurement references;

calculation means to derive from the primary numerical values $d_i$ a first secondary numerical value T which is representative of a total passage time before the sensor of each series of m references defining an angular range separating two consecutive combustions in the combustion engine;

calculation means to derive a second secondary numerical value D which is representative of a projection, onto a phase reference line of the means to define at least one reference for indexing the measurement references, corresponding to an origin of the angular range of combustions, of an amplitude of an alternating component of the instantaneous passage times $d_i$ of the measurement references sensed by the sensor at a frequency of the combustions in the combustion engine;

calculation means to derive an intermediate numerical value Cg from the relation $Cg = A \cdot D/T^3 + B/T^2$, where A and B are experimentally determined constants, contained in a memory;

means including sensors installed in an air-intake manifold to determine an air mass M pumped into a cylinder during the course of the period of combustion of another cylinder;

means to determine the pumping torque Cp required for this purpose;

means to store in memory the data M and Cp or the constituent elements of these data during the two following combustion periods;

means to combine this data or its constituent elements to produce a term $H_{n'}$ of correction of a torque $Cg_{n'}$ pertaining to the period of combustion of rank n according to the relation, $H_{n'} = -\delta \cdot (M_{n'-2} + M_{2n'-1}) + \alpha \cdot Cp_{(n'-2)}$, in which $\delta$ and $\alpha$ are constants which are dependent on the type of combustion engine, calculation means to calculate the corrected mean gas torque, generated during the course of the combustion period of rank n', according to the relation, $Cg_{cn'} = h \cdot Cg_{n'} + H_{n'}$, in which h is a calibration constant which is dependent on the type of combustion engine; and the constants $\delta$, $\alpha$ and h being stored in a permanent memory.

* * * * *